(12) United States Patent
Kisse et al.

(10) Patent No.: US 7,815,000 B2
(45) Date of Patent: Oct. 19, 2010

(54) FULLY WELDED TRACK UNDERCARRIAGE TRANSMISSION WITH INBOARD MOTOR MOUNTING FLANGE

(75) Inventors: Brandon Kisse, Kindred, ND (US);
Robert Waletzko, Lisbon, ND (US);
Mark Bares, West Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 12/251,555

(22) Filed: Oct. 15, 2008

(65) Prior Publication Data

US 2010/0089668 A1    Apr. 15, 2010

(51) Int. Cl.
*B62D 55/00* (2006.01)
(52) U.S. Cl. ................ 180/9.1; 180/9.48; 280/797; 305/130
(58) Field of Classification Search ............... 180/9.1, 180/9.48, 311, 312; 280/781, 797; 305/130
See application file for complete search history.

(56) References Cited

U.S. PATENT DOCUMENTS

| | | | |
|---|---|---|---|
| 2,002,474 A | 5/1935 | Johnston et al. ............ 280/106 |
| 3,085,643 A | 4/1963 | Schwartz et al. ............ 180/53 |
| 3,129,780 A | 4/1964 | Uyehara |
| 3,635,365 A | 1/1972 | Bauer |
| 3,767,254 A | 10/1973 | Skanes et al. |
| 3,910,367 A | 10/1975 | Drone et al. |
| 4,055,262 A | 10/1977 | Bauer |
| 4,060,261 A | 11/1977 | Bauer et al. |
| 4,074,782 A | 2/1978 | Bauer |
| 4,150,474 A | 4/1979 | Bauer et al. |
| 4,168,757 A | 9/1979 | Mather et al. |
| 4,186,812 A | 2/1980 | Sutton |
| 4,359,116 A | 11/1982 | Mankey ................ 180/6.48 |
| 4,815,550 A | 3/1989 | Mather et al. |
| 4,955,455 A | 9/1990 | Albright et al. ............ 180/291 |
| 4,962,821 A | 10/1990 | Kim |
| 4,962,825 A | 10/1990 | Albright et al. ............ 180/292 |
| 5,568,841 A * | 10/1996 | Weissbach ................ 180/311 |

(Continued)

FOREIGN PATENT DOCUMENTS

EP    1710357    10/2006

(Continued)

OTHER PUBLICATIONS

Notification of International Search Report dated Dec. 16, 2009 for Int'l Appln. No. PCT/US2009/060325 (EPO).

(Continued)

*Primary Examiner*—Toan C To
(74) *Attorney, Agent, or Firm*—Westman, Champlin & Kelly, P.A.

(57) ABSTRACT

A track driven vehicle has an undercarriage transmission assembly that has a central transmission housing forming a one piece all welded housing. The central transmission housing has upright side wall portions with multiple layers of plates or walls in a sandwich construction on which drive motors are mounted. The drive motors are on the interior of the transmission housing, with track driven sprocket assemblies on the exterior of the side walls. Track mounting pods or frames are welded to the exterior of the side walls of the transmission housing.

20 Claims, 12 Drawing Sheets

U.S. PATENT DOCUMENTS

| | | | |
|---|---|---|---|
| 5,894,908 A * | 4/1999 | Eftefield | 280/781 |
| 6,098,739 A | 8/2000 | Anderson et al. | 180/312 |
| 6,108,907 A | 8/2000 | Anderson et al. | 29/897.2 |
| 6,205,665 B1 | 3/2001 | Anderson et al. | |
| 6,401,847 B1 | 6/2002 | Lykken | 180/9.1 |
| 6,425,453 B1 | 7/2002 | Knutson et al. | |
| 6,446,744 B2 | 9/2002 | Wubbolts et al. | 180/190 |
| 6,513,614 B2 | 2/2003 | Knutson et al. | |
| 6,604,600 B2 | 8/2003 | Fournier et al. | 180/299 |
| 6,651,768 B2 | 11/2003 | Fournier et al. | 180/228 |
| 6,655,482 B2 | 12/2003 | Simmons | 180/9.1 |
| 6,719,075 B2 * | 4/2004 | Kamikawa | 180/9.1 |
| 6,742,619 B2 | 6/2004 | Farbotnik et al. | |
| 6,786,289 B2 | 9/2004 | Bateman et al. | 180/6.48 |
| 6,823,961 B2 | 11/2004 | Lamela et al. | |
| 6,832,659 B1 * | 12/2004 | Bares et al. | 180/9.22 |
| 6,902,027 B2 * | 6/2005 | Soga et al. | 180/308 |
| 6,926,105 B2 | 8/2005 | Brazier | 180/9.21 |
| 7,000,724 B2 | 2/2006 | Lamela et al. | |
| 7,036,622 B2 | 5/2006 | Iwaki | 180/311 |
| 7,044,258 B2 | 5/2006 | Lamela et al. | |
| 7,059,434 B2 * | 6/2006 | Bares et al. | 180/19.1 |
| 7,156,200 B2 | 1/2007 | Dershem et al. | 180/311 |
| 7,182,369 B2 * | 2/2007 | Baumann et al. | 280/781 |
| 7,390,021 B2 * | 6/2008 | Baumann et al. | 280/781 |
| 7,401,673 B2 * | 7/2008 | Fukazawa et al. | 180/89.12 |
| 2003/0205424 A1 | 11/2003 | Felsing et al. | |
| 2004/0239092 A1 | 12/2004 | Haringer | 280/781 |
| 2005/0167969 A1 | 8/2005 | Fukazawa et al. | 280/785 |
| 2006/0001250 A1 | 1/2006 | Fukazawa et al. | 180/781 |

FOREIGN PATENT DOCUMENTS

| | | |
|---|---|---|
| EP | 1811089 | 7/2007 |
| FR | 2 591 987 | 6/1987 |
| JP | 6 226 1580 | 11/1987 |
| JP | 2004 017705 | 1/2004 |
| WO | WO 2005/054043 | 6/2005 |

OTHER PUBLICATIONS

Written Opinion of the Int'l Searching Authority dated Dec. 16, 2009 for PCT/US2009/060325 (EPO).

Liehr, Douglas et al.: United States Defensive Publication No. T966,007 (was not accepted as a Publication on this form when entering it)—Jan. 3, 1978. Main Frame for Loader Vehicle.

* cited by examiner

FULLY WELDED TRACK UNDERCARRIAGE TRANSMISSION WITH INBOARD MOTOR MOUNTING FLANGE

BACKGROUND OF THE DISCLOSURE

The present disclosure relates to a fully welded track undercarriage transmission assembly with track frames or pods for mounting tracks for track driven machines such as compact loaders, fully welded to sides of a central transmission housing, and constructed so that the drive motors for the individual tracks for propelling the vehicle are positioned on the interior of the central transmission housing.

Transmission housings for track driven machines have been made as partially welded assemblies, but these require bolting the track pods to a central housing when the undercarriage is assembled. Overall strength of the transmission assembly is important, as well as the ability to manufacture the undercarriage transmission assemblies simply and easily, with reduced machine assembly time.

SUMMARY OF THE DISCLOSURE

A fully welded track undercarriage transmission for a track driven machine, with track pods or frames being fully welded to a center transmission housing or tub, provides a unitary assembly for the transmission and drive components that does not require further undercarriage assembly time. Track drive motors are mounted on upright, multiple layer plates or flanges that are formed on the central transmission housing. The motors are bolted to the multiple layer mounting flanges which offer increased strength and rigidity, with the motors positioned on the interior of the central transmission housing.

The central transmission housing or tub can be initially formed in selected sections that are then welded together, with formed half sections and end members forming the tub and including a central inverted channel forming a strong central, longitudinal rib welded to the bottom wall of the tub after initial forming, including braces between upright side walls that are formed integrally with the bottom wall half sections. Track pods are formed by welding the parts or components together and when formed the track pods are welded to the central transmission housing.

A main upper frame assembly or member is mounted onto the welded undercarriage transmission assembly, with the main upper frame member having side panels that fit on the exterior of upper portions of upright motor mounting flanges on the transmission housing side walls. Additional reinforcing plates are welded against the interior sides of the transmission housing side wall motor mounting flanges. Plates forming part of braces for the track pods are welded on the exterior side of the motor mounting flanges and extend half way up on the motor mounting flanges so the exterior plates are below the side panels of a main upper frame that is mounted on the undercarriage transmission assembly as the track loader is further assembled. The drive motor assemblies, including unitary gear housings, are bolted on the motor mounting flanges with bolts passing through all of the plates aligned with the upright motor mounting flanges to join the main upper frame side panels to the transmission assembly. The drive motor assemblies have output shafts mounting drive sprockets for tracks that are mounted on the track frames or pods. The drive motor assemblies have drive motor sections extending through openings in the motor mounting flanges into the interior of the transmission housing or tub. The motor assemblies are therefore centrally located in the transmission housing, which keeps the motor hydraulic connections shorter and the hydraulic connections and the motor assemblies protected.

DETAILED DESCRIPTION OF ILLUSTRATIVE EMBODIMENTS

Figure 1:
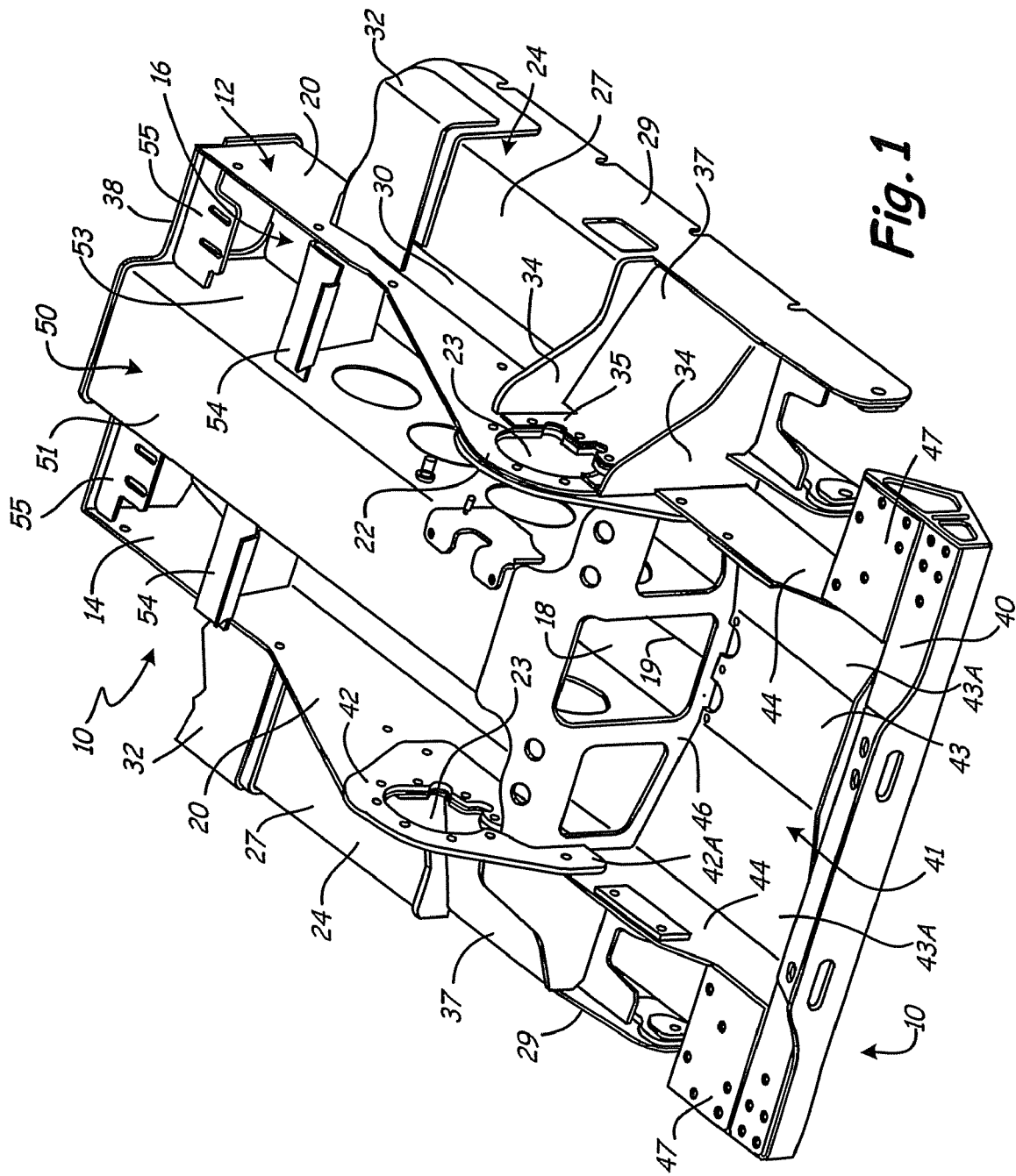
FIG. 1 is a top perspective view of a completed fully welded undercarriage transmission assembly including track mounting frames made according to the present disclosure.
Figure 2:
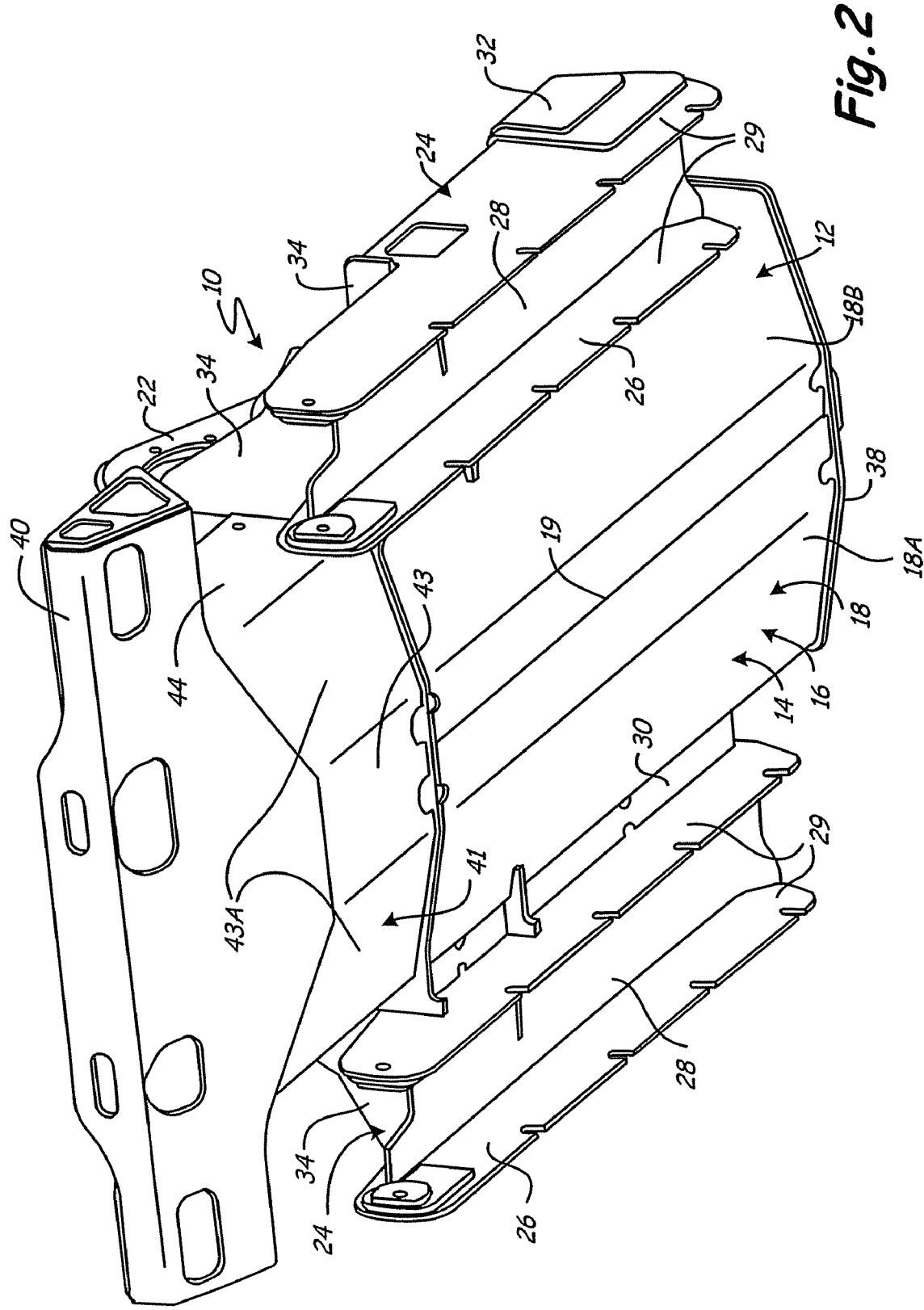
FIG. 2 is a bottom perspective view of the undercarriage transmission assembly of FIG. 1.
Figure 3:
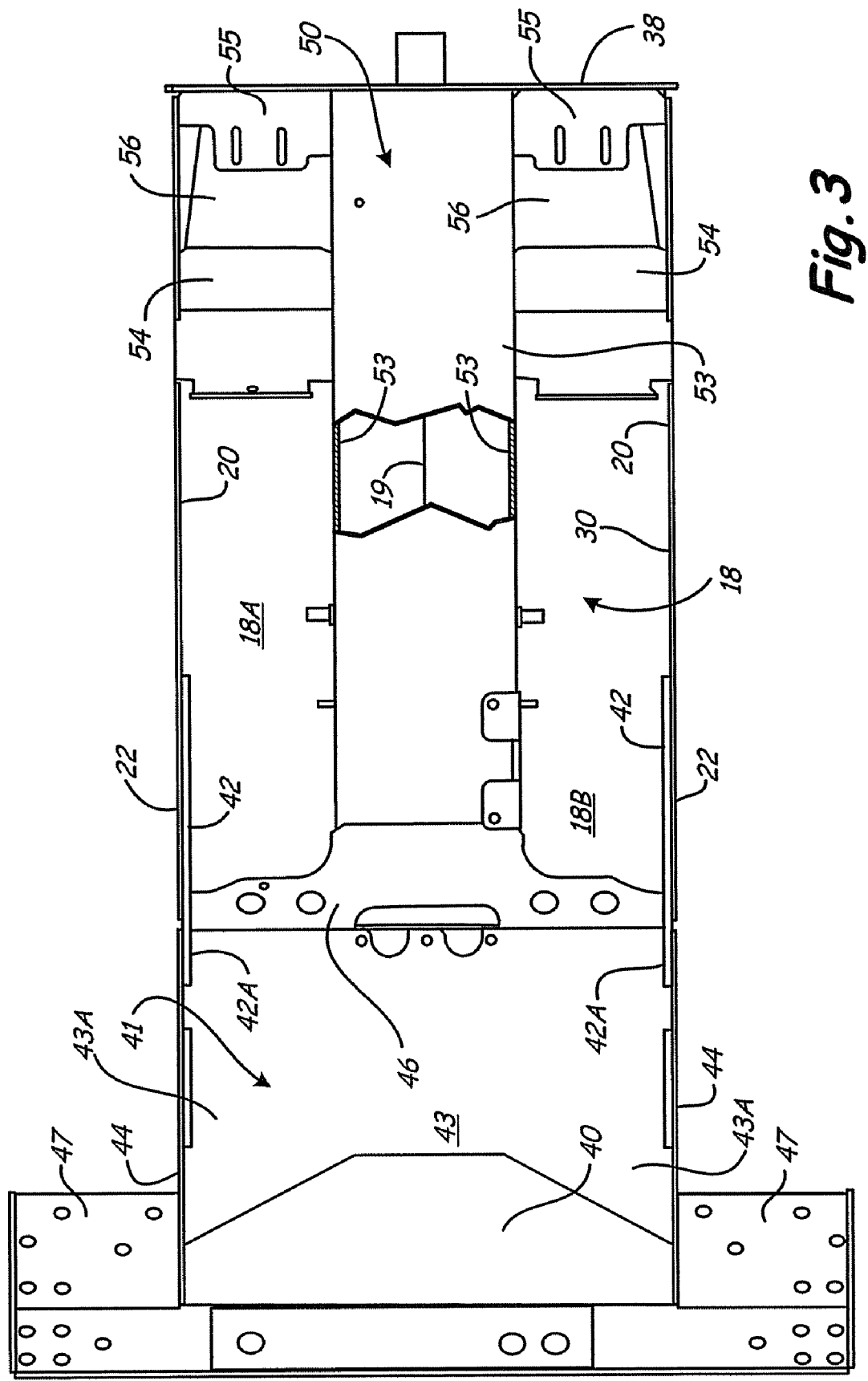
FIG. 3 is a top plan view of the undercarriage transmission housing or tub made as an initial subassembly.

A fully welded track undercarriage transmission assembly illustrated generally at 10, includes a central transmission housing or tub 16. The weldment 12 shown in FIG. 3 shows the transmission housing or tub 16, which initially starts with tub half sections 12 and 14 that are formed to have bottom wall sections 18A and 18B with formed upright side walls 20. Side walls 20 may be integral with the respective bottom wall sections 18A and 18B. The bottom wall sections 18A and 18B are welded together along a central weld 19. The side walls include an upright motor mounting flange 22 (See FIG. 8). The side walls 20 extend toward the rear of the transmission housing 16 along the length of the transmission housing 16.

Figure 7:
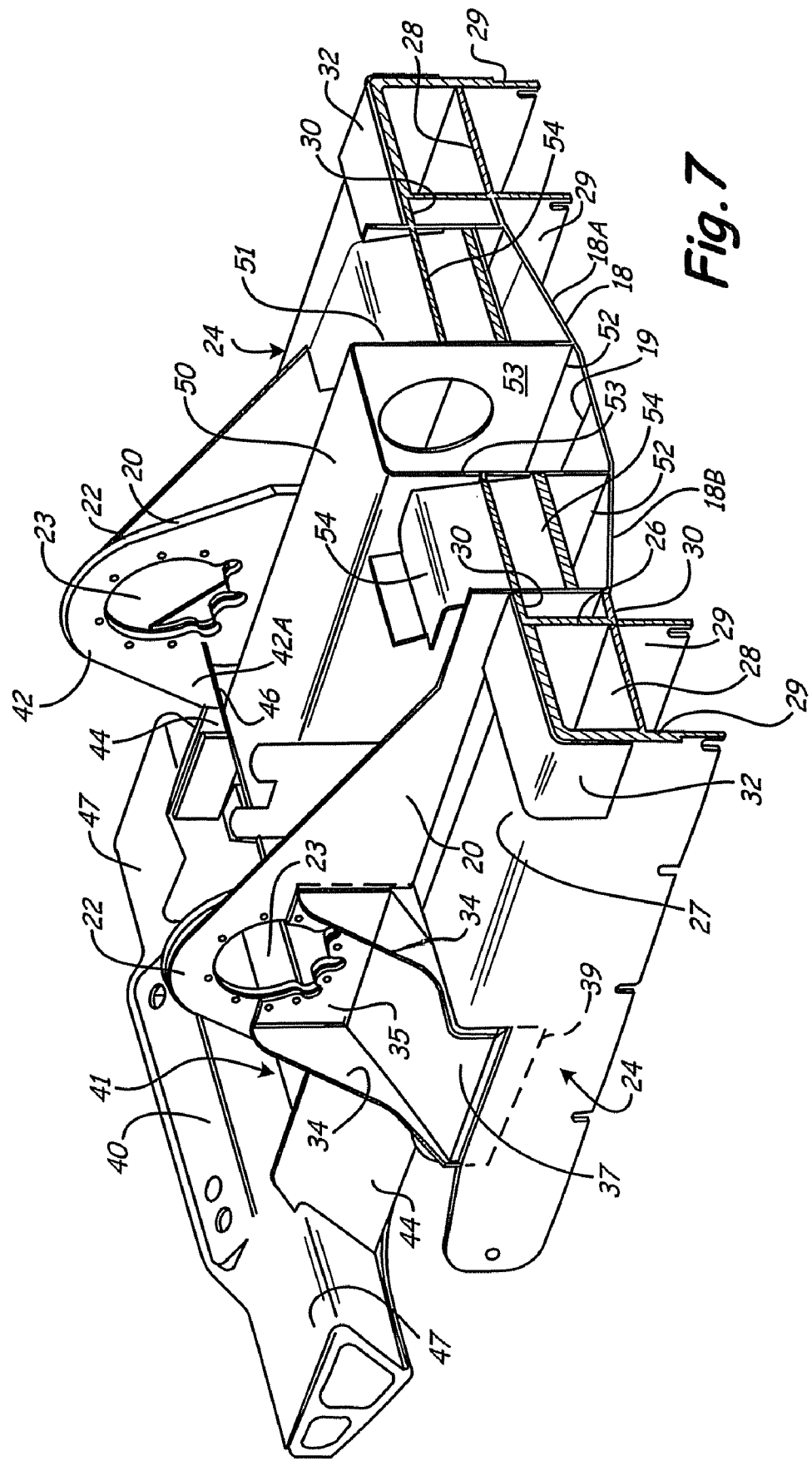
FIG. 7 is a sectional view of the undercarriage transmission taken generally along lines 7-7 in FIG. 5, but shown in a perspective view.

In the assembly shown in FIG. 3 the bottom wall 18 has been formed and the other components are welded in place to form the transmission housing or tub. The components are welded in a sequence selected for efficient assembly. A front end cross wall panel 38 is welded to the front edges of side walls 20 and bottom wall 18. Another component is a central inverted channel 50 that is then welded in place on top of bottom wall 18 in the center of the transmission housing or tub. As shown in FIG. 7, the lower edges of channel side walls 53 extending from a top wall 51 of the inverted channel 50 are welded to the bottom wall 18, along lines 52, and suitable cross braces or supports 54, 55 and 56 have ends welded at selected locations for to channel 50 and side walls 20 securing the channel 50 in position between the side walls 20. The supports 54, 55, and 56 provide support functions and shields for components of the fully assembled loader.

The central channel 50 forms a strong central reinforcing rib. Front end cross wall panel 38 is welded to the forward ends of the side walls 53 and top wall 51 of the channel 50. The front cross wall 38 also is welded to the cross braces 55, as shown. Reinforcement plates 42 are welded on the inside of the motor mounting flanges 22 of side walls 20 and the plates 42 have corner portions 42A that extend rearwardly of the side walls 20.

Figure 4:
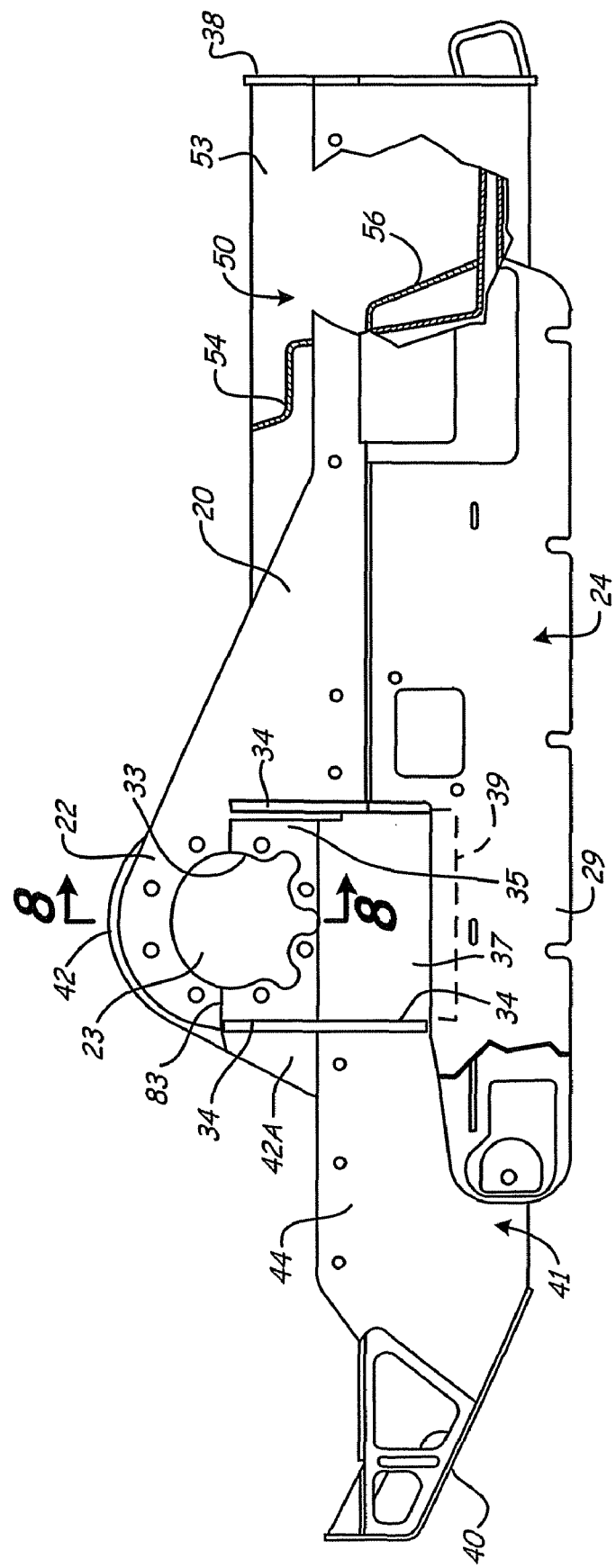
FIG. 4 is a side elevational view of the undercarriage transmission shown in FIG. 3, after further assembly of separately welded track pods have been welded onto the transmission housing.
Figure 5:
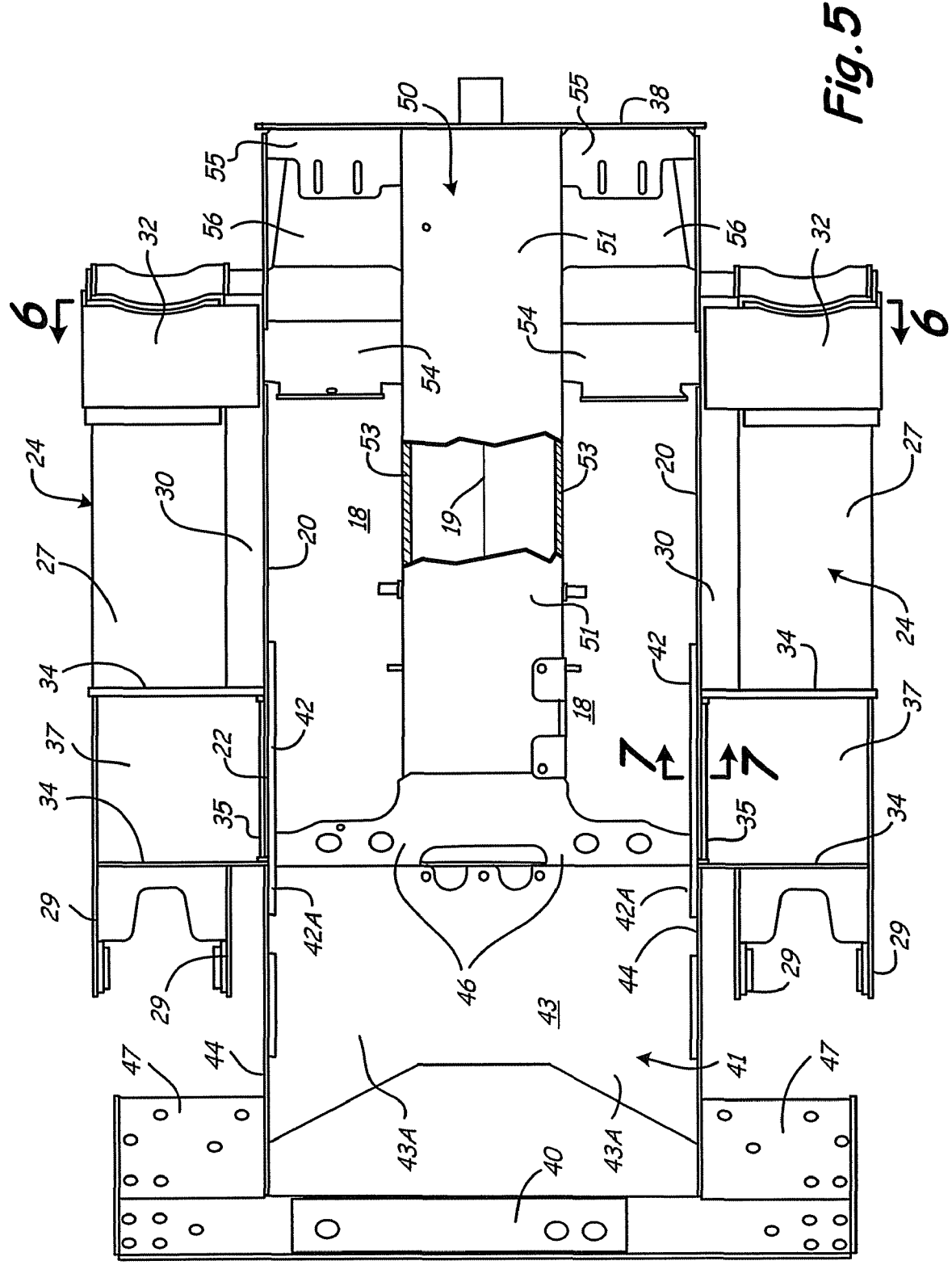
FIG. 5 is a top plan view of the undercarriage transmission assembly.
Figure 6:
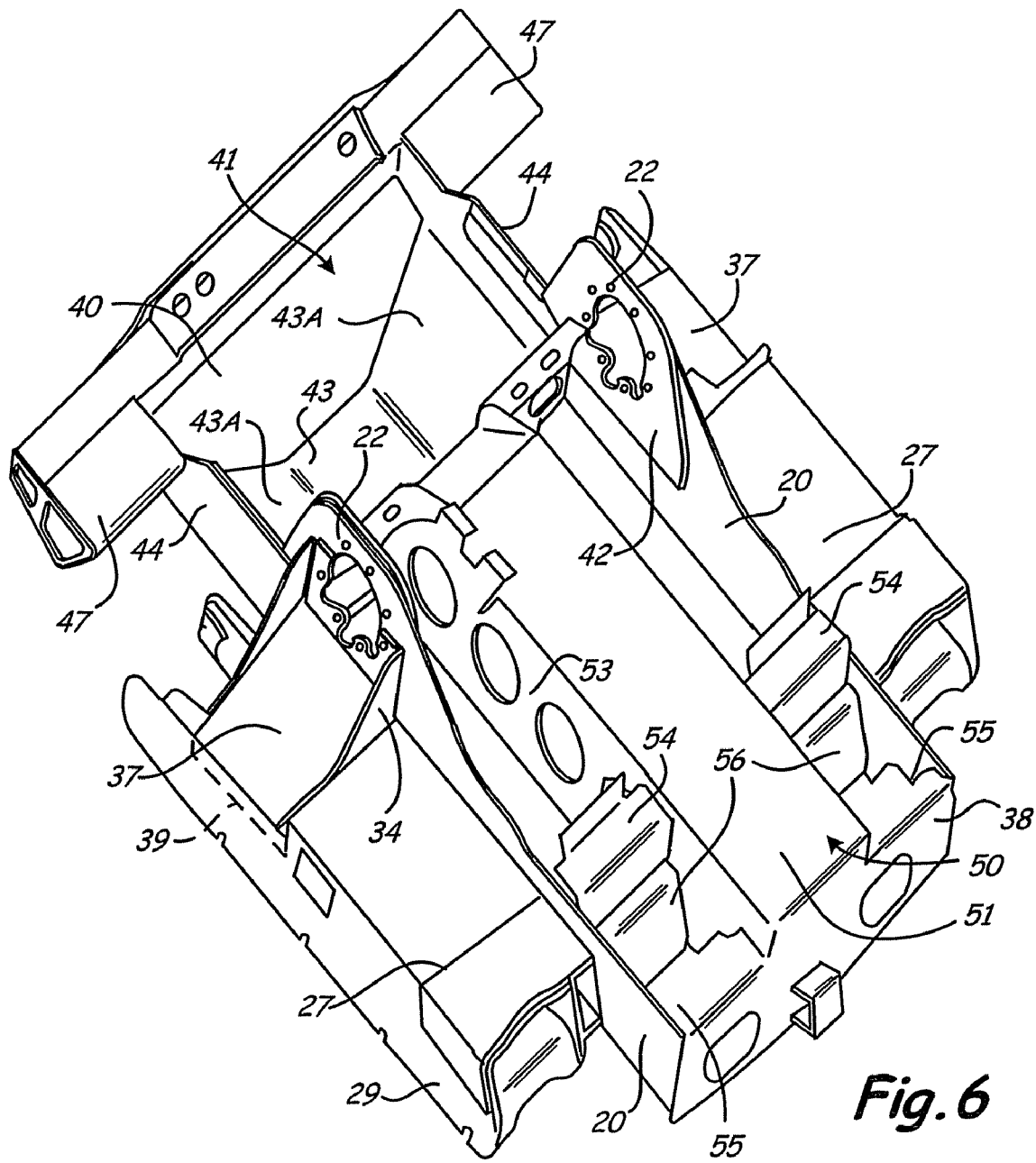
FIG. 6 is a top perspective view of the undercarriage transmission assembly.

At the rear of the central transmission housing or tub 16, a rear tub 41 is welded in place. The rear tub 41 has a bottom wall 43 with a center section and inclined side wall sections 43A. The front edge of bottom wall 43, including the inclined side wall sections 43A, are welded to the rear end of the bottom wall 18. Tub 41 also has upright side wall sections 44, and the forward ends of these side wall sections 44 are aligned with and welded to rear ends of the side walls 20, as well as to the rearwardly extending portions 42A of reinforcing plates 42 that extend rearwardly of the side walls 20, (see FIG. 4). Rear tub 41 in turn has a cross member 40 welded to the rear end thereof. Cross member 40 has an inclined wall welded to tub bottom wall 43, and has outer side portions 47 that are on the outside of the upright side wall sections 44 and are welded to side wall sections 44 of the transmission housing or tub in the assembly.

A cross member 46 that is positioned just to the rear of the motor mounting area is welded to the bottom wall 18, to the interior surfaces of side walls 20, and to the interior surfaces of the reinforcing plates 42. The welding can take place right at the junction between the bottom wall 43 of the rear tub 41 and the bottom wall 18, as well as right at the junctions with the rear ends of the side walls 20 so the cross member 46 is welded to the front edges of bottom wall 43, including forward edges of inclined wall sections 43A, and to side wall sections 44. The cross member 46 is also welded to the rear ends of the side walls 53 and the top wall 51 of the channel 50. The cross member 46 can be used for mounting the engine and various components used with a finished loader.

Right and left track frame or pods 24 can be welded together as subassemblies. Each track frame 24 is made of an inverted channel shape 26, as can be seen in FIG. 7, including an upper wall 27, and a divider wall 28 that welded to the side walls 29 on the interior of the inverted channel 26. The channel 26 of each track frame of pod has horizontal longitudinal plates forming spacers 30 that are welded to the side wall 29 of the inverted channel 26, and which will be welded against the respective transmission housing side wall 20. The horizontal plates or spacers 30 can be legs of a channel or separate plates. At the rear portions of the channel 26 the top wall of the channel is notched, and a pair of spaced, upright gussets or gusset braces 34 are welded to the top of the side walls 29 of the channel that are exposed by the notch where top wall 27 of inverted channel 26 is cut away. Channel braces 32, are provided and welded at the front end of the channel 26.

A sloping brace plate or reinforcing wall 37 is positioned between the gussets 34 on each channel 26 and is weld to the gussets. The brace plate of reinforcing wall 37 has an integral upright flange 35 that is a portion of the race plate or reinforcing wall 37 is made so it will contact the respective side wall 20 of the transmission housing when the track frames or pods are welded in place. The upright flange 35 will extend up along the motor mounting flange 22 about half way up the opening 23 for the drive motor when the track frame is welded to the side wall 20 The reinforcing wall or brace plate 37 of each track frame or pod also has a lower flange 39, shown in dotted lines in FIGS. 4 and 7 that welds to the outer leg 29 of the respective track frame.

The track frames or pods can be welded as separate right and left subassemblies to the side walls 20 of the central transmission housing or tub 16. The edges of the spacers 30 are welded full length to the respective side wall 20. Also the gussets 34 are welded to the respective side wall 20 and the rear gusset 34 is welded to the aligning side wall section 44 of the rear tub 41. The upright flanges 35 are welded in place at the lower portion of the motor mounting flanges 22. Each flange 35 has a recess 33 that aligns with a lower half of opening 23 and has holes aligning with bolt holes in the motor mounting flange 22 for bolts or capscrews that hold the motors in place on each side of the transmission housing.

A reinforcing plate 42 is welded to each of the motor mounting flanges 22 on the interior of the motor mounting flanges. The reinforcement plates 42 have openings aligning with the openings 23 for the motors and also have bolt holes for mounting the motors.

Figure 10:
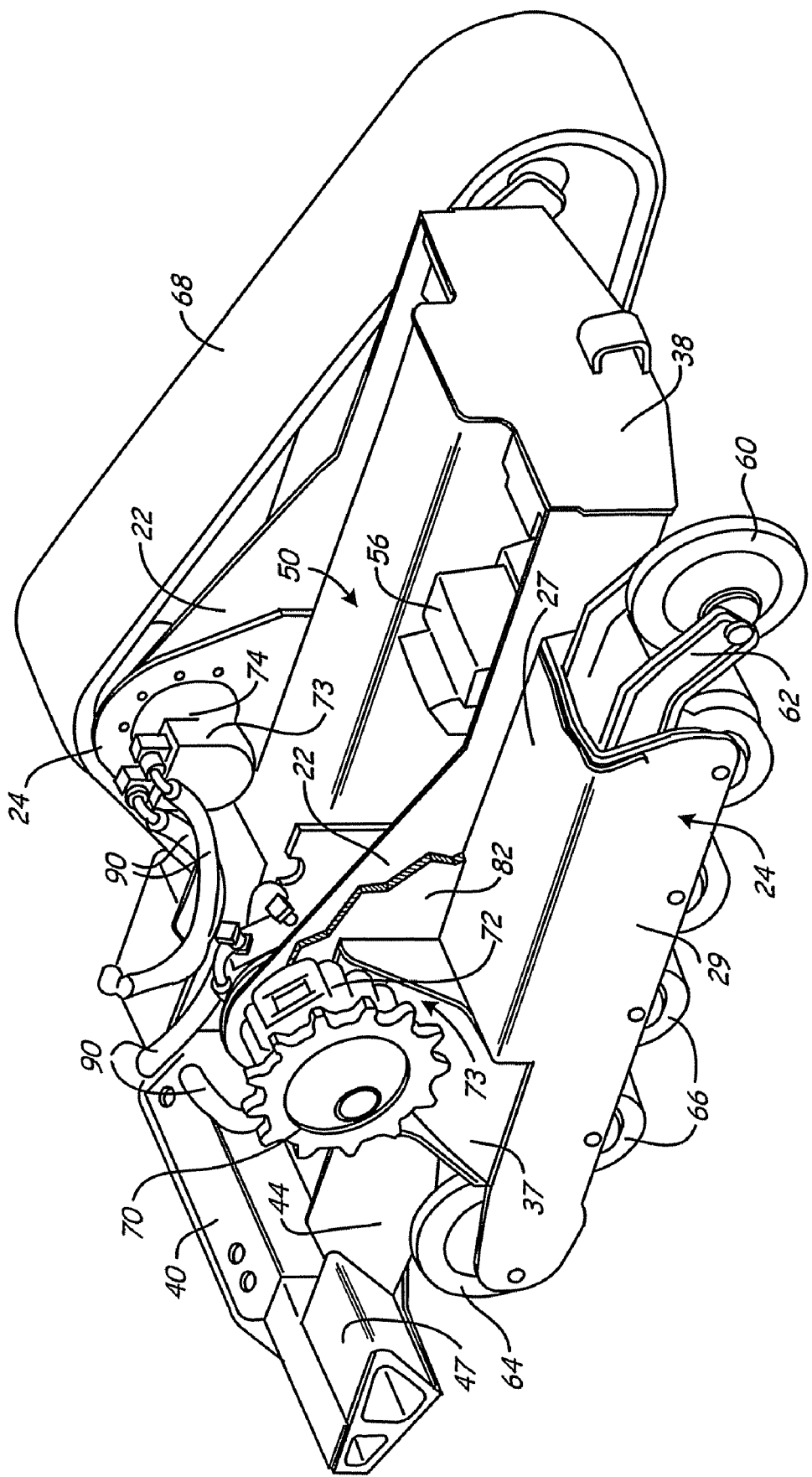
FIG. 10 is a perspective view of a transmission assembly with some drive components installed.

The use of the channel-shaped members 26 for forming the track frames or pods 24 provides lower side wall portions of side walls 29, below the cross wall 28, for mounting bogie wheels 66 (FIGS. 10 and 11) The space above the wall 28 in each track frame 24 is used for mounting track tensioners 60, as shown in FIG. 10.

Figure 11:
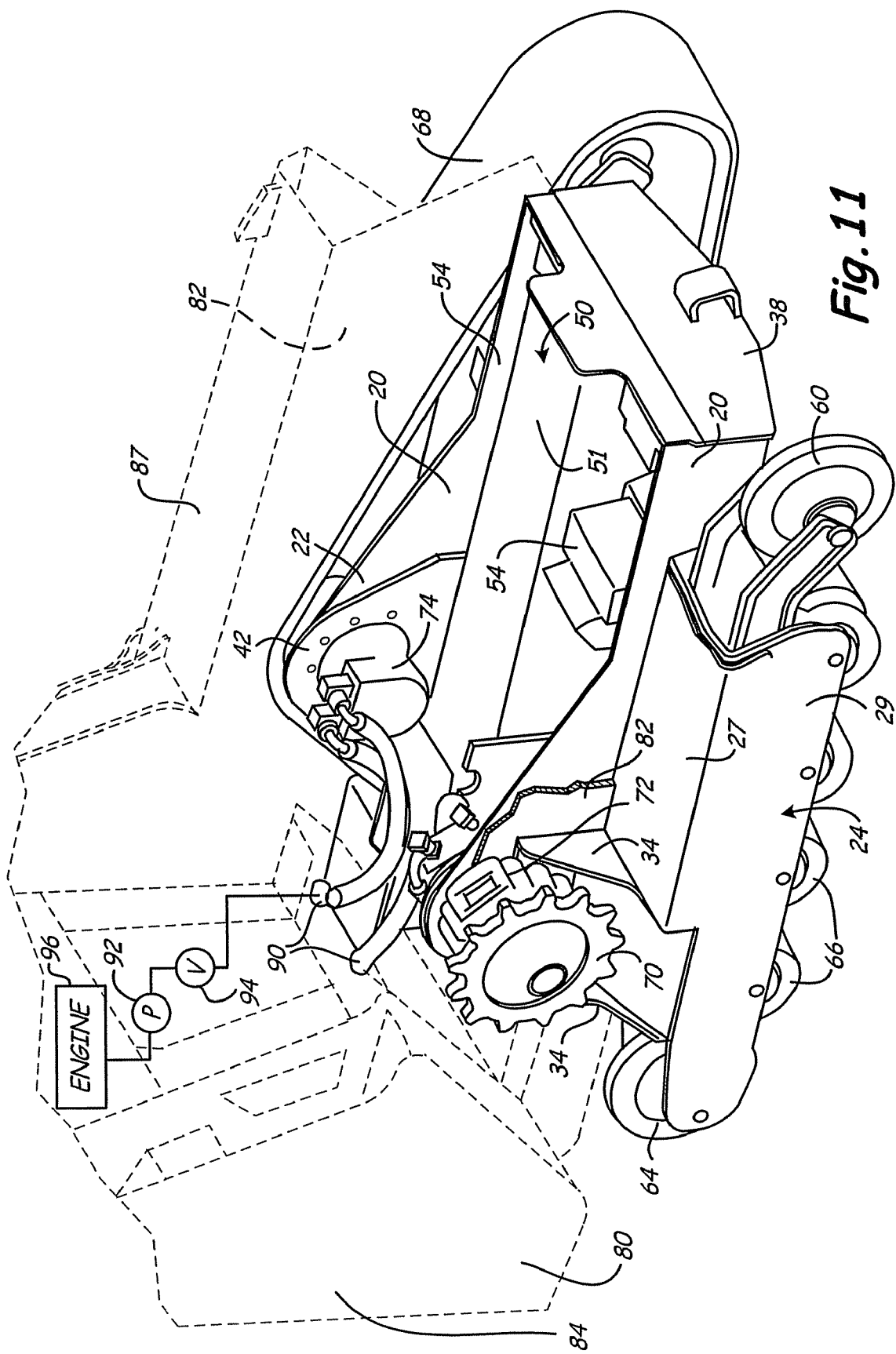
FIG. 11 is a perspective view similar to FIG. 10, with portions of a main upper frame shown in position with dotted lines, with parts broken away for illustrative purposes.
Figure 12:
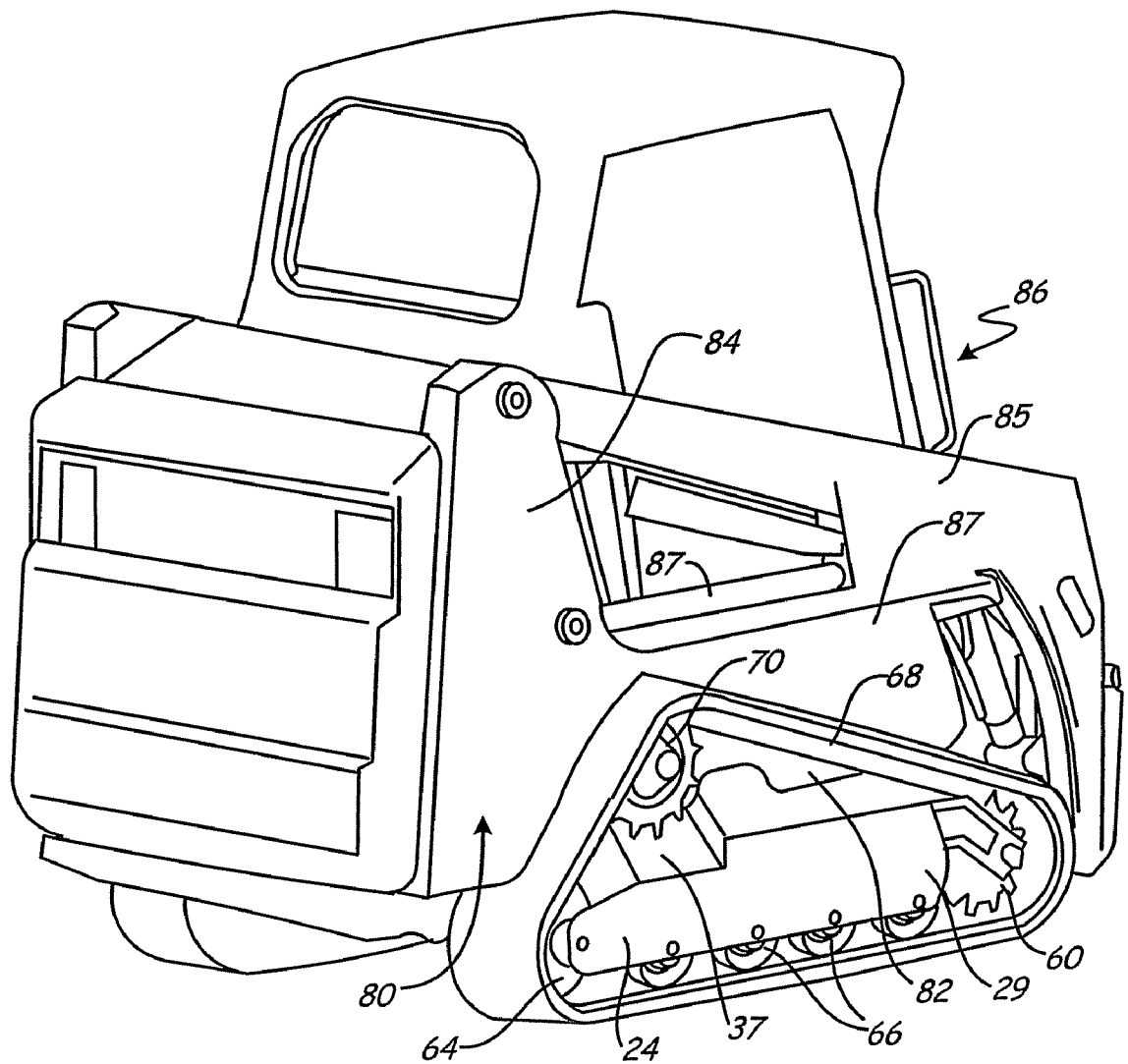
FIG. 12 is a simplified rear perspective view of a compact loader having a transmission assembly made according to the present disclosure.

FIG. 11 is a schematic perspective view of the undercarriage transmission assembly 10, further assembled to show other machine components in place for illustrative purposes. FIG. 12 is a simplified rear perspective view of a compact loader using the fully welded transmission housing as a main frame. The track frame or pod 24 on each side of the transmission assembly is provided with a front tensioning roller 60 which is mounted on a suitable spring loaded slide arm 62. A rear idler roller 64 is mounted on the side walls 29 of the track frame channel 26, below cross wall 28. The bogie wheels 66 are mounted in the lower mounting slots in side walls 29 of the track frame channel 26. A track 68 is illustrated on the undercarriage transmission assembly 10 in FIGS. 10, 11 and 12, and as shown, it is mounted over the track tensioning roller 60 and the idler roller 64, and also over a drive sprocket 70. The drive sprocket 70 on each side of the transmission housing is drivably mounted on an output shaft of a motor assembly 73 that includes gear housing section 72 that is part of the motor assembly 73 and is driven by a respective hydraulic drive motor section 74 of the motor assembly. The motor assembly 73 is shown in position on the motor mounting flange 22 in FIG. 8. The hydraulic drive motor sections 74, as can be seen, are on the interior side of the mounting flanges 22, and reinforcement plates 42 so that the motor sections 74 are on the interior of the undercarriage transmission assembly. The motor assemblies are mounted from the outside of the walls 20 by passing the motor sections through the openings 23 of the motor mounting flanges and then the flanges on the gear housing sections 72 are attached with mounting bolts or capscrews or other suitable fasteners.

The motor sections 74 thus do not extend outwardly from the side plates 20 of the transmission housing 16. When the motor assemblies 73 are secured in place, the mounting bolts or capscrews holding the motor assemblies also will clamp the side panels or plates 82 of a main upper frame 80 onto the motor mounting flanges 22, as shown fragmentarily in FIG. 11. The main frame 80 is shown in dotted lines in FIG. 11 and is a separate weldment that has the side panels or plates 82 and upright supports 84 (FIG. 12) that can be used for mounting lift arms 85 for a small loader 86. The side plates 82 of the main frame are formed to provide a material layer or plate portion on the exterior of the side walls 20 along an upper part of the motor mounting flange 22, (upper half of the motor) above the flange 35 and gussets 34.

The lower edges of side plates 82 are recessed as at 81 to form motor openings aligning with for openings 23 where the side plates 82 mate with the exterior of the motor mounting flanges 22.

Figure 8:
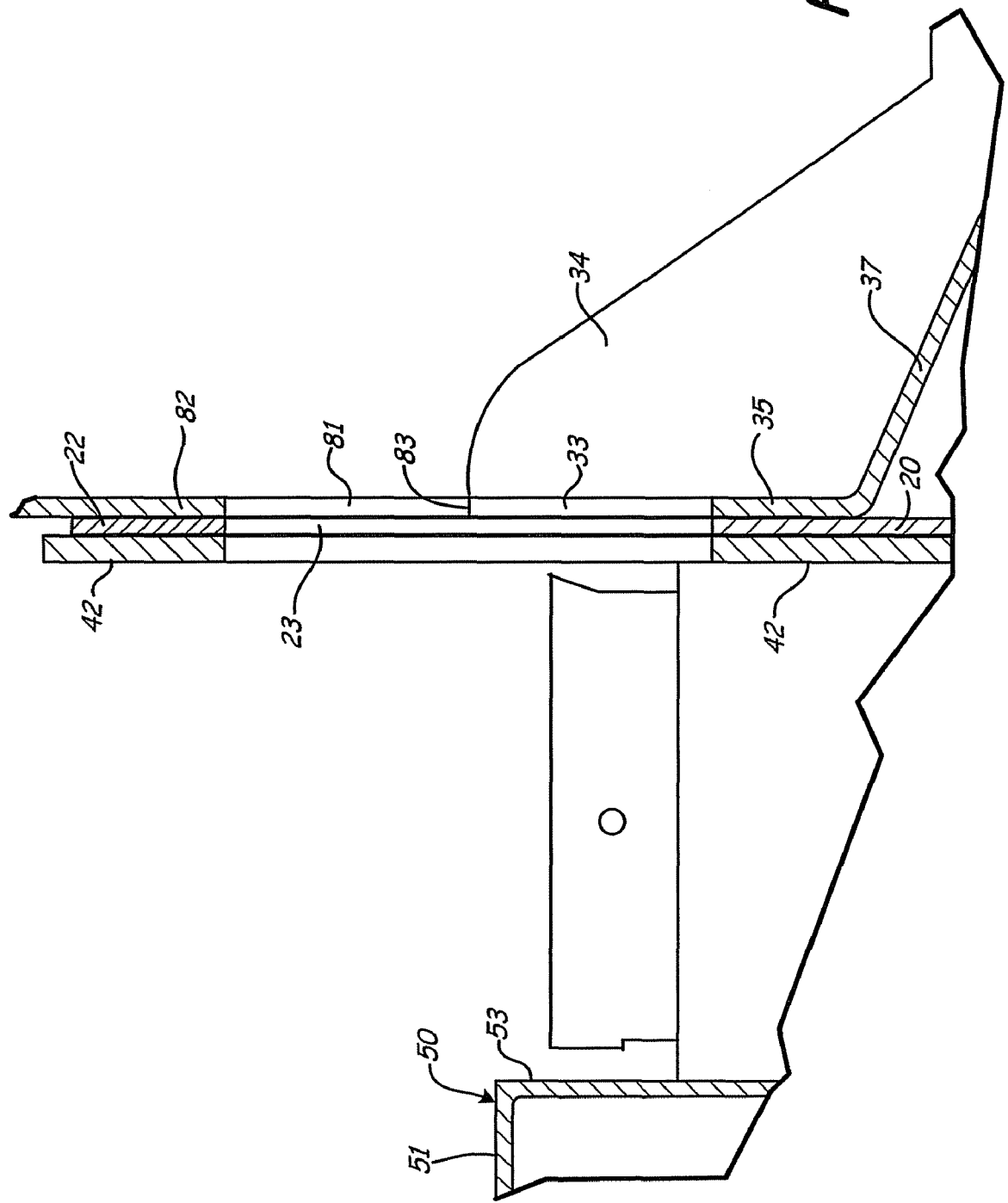
FIG. 8 is a sectional view of a motor mounting flange taken generally along line 8-8 in FIG. 4.
Figure 9:
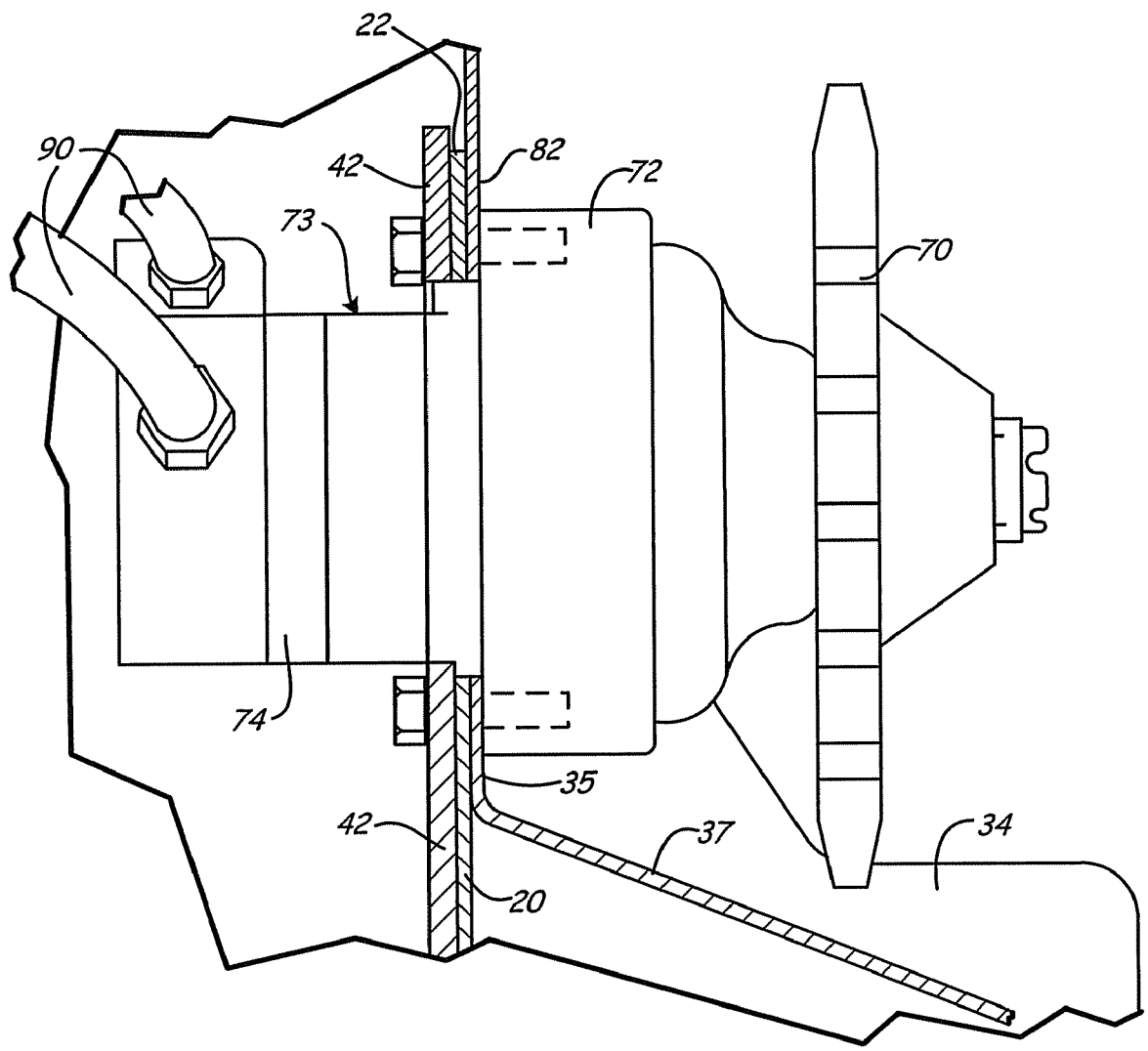
FIG. 9 is a sectional view taken as on the same line as FIG. 8 showing a drive motor and gear housing in place on the motor mounting flange.

The portions of the side plates 82 that align with the motor mounting flanges are positioned above and are the same thickness as flanges 35 of the reinforcing wall 37. The upper edges of the flanges 35 meet the lower edges of the side plates 82 at the motor mounting flanges 22 as shown at line 83 in FIG. 8. The side panels or plates 82 of the main frame 80 are clamped against the upper part of motor mounting flanges 22 of side walls 20 when the motors are secured. The motor mounting flanges 22, the reinforcing plates 42, the main frame side plates 82, and, below the side plates 82, the flanges 35, as shown in FIGS. 8 and 9, provide a multiple layer sandwich of motor support plates for rigidity and strength. The motor support plates are braced back to the track frames or pods 24 with the gussets 34, the inclined walls or brace plates 37 and the flanges or brace plate portions 35 and 39 on the walls or brace plates 37.

It can be seen in FIGS. 9, 10 and 11 that suitable hydraulic lines 90 are protected by being on the interior of the side walls 20 of the transmission housing 16 and they are also easily connected to hydraulic connections such as a pump 92, through valves 94. The pump 92 is driven from an engine represented only schematically at 96. The engine 96 provides the power for the track driven machine.

The undercarriage transmission assembly weldment 10, including the welded on track frames or pods, provides for a narrower overall frame, by avoiding the need for any additional bolt on spacers or cross members relative to the center transmission housing 16. The welded track pods and transmission housing provide great rigidity and strength. The mounting of the drive motor sections 74 on the interior of the transmission housing 16, that is, on the inside of side walls 20, also reduces the overall width necessary to accommodate drive components.

The single weldment of the undercarriage transmission assembly that is made prior to the assembly of the other components, such as motors, bogies, controls the upper main frame member and tracks that are shown partially in FIGS. 11 and 12 makes overall machine assembly time less because there are fewer bolted on parts and components. The track frames are not bolted on the central transmission housing or tub. The ability to have reinforced or sandwiched flanges or flange plates for bolting on the motors provides a rigid mounting to withstand the loads on the drive motors encountered when driving the tracks.

Although the present invention has been described with reference to preferred embodiments, workers skilled in the art will recognize that changes may be made in form and detail without departing from the spirit and scope of the invention.

What is claimed is:

1. A welded transmission assembly for a track driven vehicle comprising a transmission housing having a pair of spaced apart side walls, a bottom wall joining said side walls, first and second track frames welded to exterior sides of the respective side walls, each of said side walls having an uprightly extending motor mounting flange adjacent one end thereof, a separate reinforcing plate welded to an interior side of each of the motor mounting flanges of the side walls, a welded gusset brace extending from an exterior side of each of the motor mounting flanges to the respective track frame, and a brace plate welded on the exterior side of each of the side walls adjacent the gusset braces and each brace plate having a portion at least partially extending along the respective motor mounting flanges.

2. The transmission assembly of claim 1, wherein said bottom wall is initially formed in two bottom wall sections separated along a longitudinal length, each of the sections of the bottom wall being integral with a respective one of the side walls, and a longitudinal junction of edges of the bottom wall sections being welded together, substantially along a center line of the transmission housing.

3. The transmission assembly of claim 1, wherein said first and second track frames comprise inverted track frame channel members each having a top wall and channel side walls extending downwardly from the top wall, the track frame channel members being attached by welding to the side walls of the transmission housing.

4. The transmission assembly of claim 2 and a first end cross wall welded to the side walls and the bottom wall at an end of the transmission housing spaced from the motor mounting flanges.

5. The transmission assembly of claim 4 and a second end cross member welded to and extending between the side walls adjacent to the motor mounting flanges.

6. The transmission assembly of claim 1 further comprising an inverted central channel member on an upper side of the bottom wall, said inverted central channel member having a top wall and channel side walls having edges welded to the bottom wall, the inverted central channel member being between and spaced from interior surfaces of the side walls.

7. The transmission assembly of claim 1 further comprising a pair of side panels of a main upper frame, each of the side panels of the main upper frame having a side panel portion positioned on an exterior side of one of the motor mounting flanges of the side walls and extending around a portion of an opening in the motor mounting flange for a respective motor and positioned above a portion of the respective brace plate; the reinforcing plates, the motor mounting flanges, the portions of the brace plates and the side panel portions of the main upper frame all having holes for fasteners to clamp a motor and the respective motor mounting flange, reinforcing plate, portion of the brace plate and side panel portion together.

8. The transmission assembly of claim 7, wherein the side panel portions of the main upper frame are substantially the same thickness as the portions of the brace plates and are positioned directly above an upper edge of the respective portion of the brace plate, the portions of the brace plates extending substantially half way up along opposite sides of an opening for the respective motor.

9. The transmission assembly of claim 3, wherein said inverted track frame channel members each includes a cross wall panel positioned below the top wall thereof and extending between the inverted track frame channel side walls, and welded to the channel side walls.

10. The transmission assembly of claim 3, further comprising lateral wall spacers between the inverted track frame channel members and the respective side walls of the transmission housing, the spacers between the side walls of the transmission housing and a respective inverted track frame channel side wall comprising a pair of generally horizontal wall sections extending between the respective inverted track frame channel side wall and a side wall of the transmission housing.

11. A transmission assembly for a motor driven vehicle comprising a transmission housing having a pair of spaced apart side walls with motor mounting portions, said motor mounting portions having motor openings therethrough for mounting motors having motor portions that extend through the side walls from an interior side to an exterior side, a reinforcement plate on the motor mounting portions welded to each of the side walls on an interior side of the motor mounting portions and having an opening aligning with the motor opening in the associated motor mounting portion of the associated side wall, and a brace plate flange portion on an exterior side of each of the motor mounting portions extending part way up along an exterior of the respective side wall and having a recessed opening aligning with a lower portion of the motor opening in the respective motor mounting portion of the respective side wall, and an upper frame panel on an exterior side of the each of the side walls, said upper frame panels each having a partial cut out aligning with the motor opening in the respective motor mounting portion of the respective side wall, a plurality of openings for fasteners aligning with fastener openings for a motor to permit fasteners to be inserted to hold and clamp a motor, the motor mounting portion, the reinforcing plate, the brace plate flange portion and the upper frame panel at each motor mounting portion together when mounting a motor.

12. The transmission assembly of claim 11 wherein the side walls are spaced apart to permit motors to extend inwardly from the interior sides of the motor mounting portions.

13. The transmission assembly of claim 11, further comprising a separate track frame welded to an exterior side of each of the side walls at a level below the motor mounting portions.

14. The transmission assembly of claim 11 and a bottom wall integral with and extending between the side walls of the transmission housing.

15. The transmission assembly of claim 14 and a longitudinally extending inverted central channel having spaced central channel side legs welded to an upper side of the bottom wall along longitudinal junctions between the spaced channel side legs of the inverted central channel and the bottom wall.

16. A method of manufacturing an undercarriage transmission for a work vehicle comprising forming a transmission housing having a bottom wall and spaced upright housing side walls joined to the bottom wall, providing motor mounting portions on the housing side walls, welding cross wall members to front and rear ends of the housing side walls, welding a longitudinally extending inverted channel to the bottom wall with channel side walls of the inverted channel spaced from the housing side walls, and welding reinforcing members between the housing side walls and the channel side walls of the inverted channel.

17. A method of manufacturing an undercarriage transmission for a vehicle comprising forming a transmission housing having a bottom wall and spaced upright side walls joined to the bottom wall, welding cross wall members to front and rear ends of the side walls, welding reinforcing between the side walls, including forming the bottom wall as two longitudinally extending bottom wall sections, and welding the bottom wall sections together along a junction of edges of the bottom wall sections and thereby spacing the side walls apart, before welding the cross wall members to front and rear ends of the side walls.

18. A method of manufacturing an undercarriage transmission for a vehicle comprising forming a transmission housing having a bottom wall and spaced upright side walls joined to the bottom wall, welding cross wall members to front and rear ends of the side walls, welding reinforcing between the side walls, and providing motor mounting portions on the side walls having openings for mounting a motor on each motor mounting portion, welding a reinforcing plate on an interior side of each motor mounting portion, and providing the reinforcing plates with openings matching openings for mounting motors in the respective motor mounting portion.

19. The method of claim 18 further characterized by welding track frames to exterior sides of the side walls of the transmission housing.

20. A transmission assembly for a motor driven vehicle comprising a transmission housing having a pair of spaced apart side walls with motor mounting portions, said motor mounting portions having motor openings therethrough for mounting motors having motor portions which extend through the motor openings, a separate reinforcement plate on each of the motor mounting portions welded to each of the side walls on an interior side of the motor mounting portions and having an opening aligning with the motor opening in the associated motor mounting portion of the associated side wall, and a brace plate flange on an exterior side of each of the motor mounting portions extending at least part way up along an exterior of the respective motor mounting portion of the respective side wall and having a opening aligning with at least a lower portion of the motor opening in the respective motor mounting portion of the respective side wall, a plurality of openings for fasteners in each motor mounting portion, reinforcing plate and brace plate flange positioned to align with fastener openings for a motor to be mounted on the transmission assembly to permit fasteners to be inserted to hold and clamp a motor, the motor mounting portion, the reinforcing plate and the brace plate flange together when mounting a motor on the respective motor mounting portion.

* * * * *

UNITED STATES PATENT AND TRADEMARK OFFICE
CERTIFICATE OF CORRECTION

PATENT NO. : 7,815,000 B2  
APPLICATION NO. : 12/251555  
DATED : October 19, 2010  
INVENTOR(S) : Brandon Kisse et al.

Page 1 of 1

It is certified that error appears in the above-identified patent and that said Letters Patent is hereby corrected as shown below:

Title Page

(56) - References Cited

| Please insert | --3,645,350 | 02/1972 | Deli-- |
| Please insert | --7,373,999 | 05/2008 | Haringer-- |

Signed and Sealed this  
Fifteenth Day of February, 2011

David J. Kappos  
*Director of the United States Patent and Trademark Office*